US011758071B1

(12) United States Patent
Bansal et al.

(10) Patent No.: US 11,758,071 B1
(45) Date of Patent: Sep. 12, 2023

(54) IDENTIFICATION AND REMOVAL OF NOISE FROM DOCUMENTS

(71) Applicant: HighRadius Corp., Houston, TX (US)

(72) Inventors: Mohit Bansal, Hyderabad (IN); Rehan Ahmad, Hyderabad (IN); Harshita Srivastava, Hyderabad (IN); Shrey Chirag Shah, Hyderabad (IN)

(73) Assignee: HighRadius Corporation, Houston, TX (US)

( * ) Notice: Subject to any disclaimer, the term of this patent is extended or adjusted under 35 U.S.C. 154(b) by 0 days.

(21) Appl. No.: 17/873,954

(22) Filed: Jul. 26, 2022

(51) Int. Cl.
*H04N 1/58* (2006.01)
*G06V 30/40* (2022.01)

(52) U.S. Cl.
CPC ............... *H04N 1/58* (2013.01); *G06V 30/40* (2022.01)

(58) Field of Classification Search
CPC ........................................................ H04N 1/58
USPC ........................................................ 358/494
See application file for complete search history.

(56) References Cited

U.S. PATENT DOCUMENTS

2019/0197693 A1* 6/2019 Zagaynov ............. G06T 11/203

* cited by examiner

*Primary Examiner* — Jacky X Zheng
(74) *Attorney, Agent, or Firm* — Adsero IP

(57) ABSTRACT

Novel tools and techniques are provided for implementing identification and removal of noise from documents, and, more particularly, to methods, systems, and apparatuses for implementing identification and removal of noise from financial documents using one or more machine learning algorithms. In various embodiments, computing system might receive a document. The computing system might detect, using one or more machine learning algorithms, that noise exists in the document. Based on the detection that noise exists in the document, the computing system might remove the noise from the document. Once the noise is removed from the document, the computing system might generate a copy of the document with the noise removed while retaining important or useful information contained in the document.

20 Claims, 16 Drawing Sheets

| | | | | 400d |
|---|---|---|---|---|
| Company, LLC | | | | |
| Reference No. | Date | Amount | Discount | Description |
| 123456 | 1/1/2022 | $1,000.00 | $100 | |
| 123457 | 1/15/2022 | $2,000.00 | $150 | |
| | | $3,000.00 | $250.00 | $2,750.00 | 1/31/2022 |
| | | Total Invoices | Total Discounts | Net Amount of Check | Check Date |

IDENTIFICATION AND REMOVAL OF NOISE FROM DOCUMENTS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing identification and removal of noise from one or more documents, and, more particularly, to methods, systems, and apparatuses for implementing identification and removal of noise from one or more documents using one or more machine learning algorithms.

BACKGROUND

Conventional scanned documents or images of documents often have noise (e.g., small black and white dots) cluttering up the scanned documents or images of documents. This noise can be scattered throughout a document concealing or disguising useful or important data contained within the document. The noise makes it hard for computers and/or machine learning algorithms to identify and extract the useful or important data within a scanned document or image. Instead, this useful or important data must be identified and extracted from the scanned document or image manually by one or more users. This manual identification and extraction process is time consuming and could result in the identification, extraction, and entry of incorrect information or data.

Thus, there is a need for development of systems, apparatuses, and methods that are capable of automatically removing noise from one or more documents while retaining important or useful information contained within the document. Further, there is a need for automatically analyzing, identifying, and extracting relevant or important data from the one or more documents or images containing noise. Hence, there is a need for more robust and scalable solutions for implementing identification and removal of noise from documents, and, more particularly, for implementing identification and removal of noise from documents using one or more machine learning algorithms.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4D are example documents illustrating the method for implementing identification and removal of noise from one or more documents, in accordance with various embodiments.

DETAILED DESCRIPTION OF CERTAIN EMBODIMENTS

Overview

Figure 1:
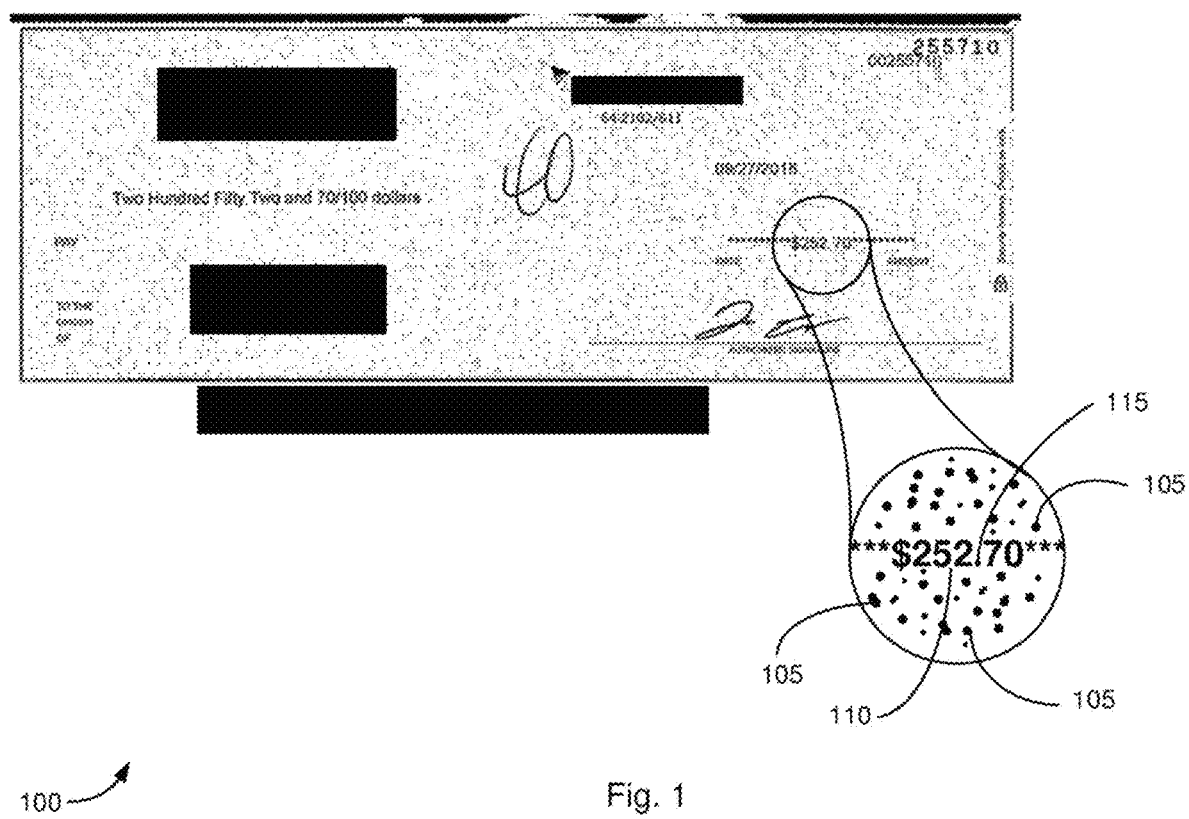
FIG. 1 is an example document containing noise, in accordance with various embodiments.

Various embodiments provide tools and techniques for implementing identification and removal of noise from documents, and, more particularly, provide methods, systems, and apparatuses for implementing identification and removal of noise from documents using one or more machine learning algorithms.

In various embodiments, a computing system might receive a document. The computing system might detect, using one or more machine learning algorithms, that noise exists in the document. Based on the detection that noise exists in the document, the computing system might remove the noise from the document. Once the noise is removed from the document, the computing system might generate a copy of the document with the noise removed.

Removing the noise from the document might include, without limitation, identifying, using the computing system, one or more contours of one or more continuous points in the document; determining, using the computing system, one or more first contours associated with potential noise; detecting, using the computing system, whether there are one or more neighboring contours near the one or more first contours associated with potential noise; and based on a detection of no, one, or more neighboring contours near the one or more first contours associated with potential noise, determining, using the computing system, whether each first contour of the one or more first contours associated with potential noise is not noise or is noise. Based on the noise removal from the document, the computing system might generate a copy of the document with each first contour that is not noise and without each first contour that is noise.

Several advantages may be realized by implementing the embodiments described herein. For example, the computing system can automatically learn, using one or more machine learning algorithms, to identify noise contained within one or more documents. The computing system may then flag documents affected by noise for further image processing to remove the noise. This improves image processing technology and the quality of one or more scanned documents or images of scanned documents. Additionally, once the one or more documents have been identified as containing noise, the computing system may implement one or more processes or machine learning algorithms to clarify, sharpen, and/or remove the noise from scans or images of the document while retaining important or useful information contained within the document. These clarified or sharpened documents may then be used by the computing system to extract useful or important information from the document automatically by a computing system. This significantly reduces data entry functions of users and improves computing efficiency by automatically identifying, extracting, and entering relevant or important information and ignoring irrelevant and unimportant noise.

These are all improvements over prior art where information contained in documents with noise would have to be identified and extracted manually by a user. In summary, all embodiments described in this disclosure make removal of noise and identification, extraction, and entry of information more efficient and effective. These and other aspects of the tools and techniques for implementing noise removal to sharpen or clarify one or more documents and to reduce identification time, extraction time, and handling time of information are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, data entry technology, data mapping technology, data extraction technology, data clustering technology, machine learning technology, noise removal technology, image processing technology, and/or the like. In other aspects, certain embodiments can improve the functioning of user equipment or systems themselves (e.g., data entry technology, data mapping technology, data extraction technology, data clustering technology, machine learning technology, noise removal technology, image processing technology, etc.), for example, by detecting, using one or more machine learning algorithms, that noise exists in the document, by improving the speed and accuracy of the user equipment to in real-time automatically detect, identify, and remove noise from one or more documents, by efficiently and accurately identifying one or more contours associated with noise and one or more other contours not associated with noise, by generating copies of the one or more documents with noise removed, and/or the like. For instance, the following steps may be performed in as one or more documents are received by a computing system: detecting, using one or more machine learning algorithms, that noise exists in one or more documents, automatically detecting, identifying, and removing noise from the one or more documents, automatically identifying one or more contours associated with noise and one or more other contours not associated with noise, automatically generating copies of the one or more documents with noise removed; and/or the like. In this manner, the computing system can perform functions that the computing system could not previously perform. For instance, the computing system can, automatically detect, identify, and remove noise from the one or more documents, automatically identify one or more contours associated with noise and one or more other contours not associated with noise, and automatically generate copies of the one or more documents with noise removed. Additionally, the generated copies of the one or more documents are higher quality, sharper, and clearer than the documents originally received by the computing system.

In particular, to the extent any abstract concepts are present in the various embodiments, those concepts can be implemented as described herein by devices, software, systems, and methods that involve specific novel functionality (e.g., steps or operations), such as, automatically detecting, using one or more machine learning algorithms, that noise exists in one or more documents, automatically detecting, identifying, and removing noise from the one or more documents, automatically identifying one or more contours associated with noise and one or more other contours not associated with noise, automatically generating copies of the one or more documents with noise removed; and/or the like. These particular steps, to name a few examples, extend beyond mere conventional computer processing operations. These functionalities can produce tangible results outside of the implementing computer system, including, merely by way of example, real-time feedback and identification of data from a document, improved accuracy, precision, and processing speed of computing systems, using machine learning algorithms, based on removal of noise from a document, improved image processing resulting in higher quality, clearer, and sharper scans or images of documents without noise, automatic analysis of document with noise removed, and/or the like, at least some of which may be observed or measured by users of the computing system, customers, and/or companies.

In an aspect, a method might comprise receiving, using a computing system, a document and detecting, using the computing system and one or more machine learning algorithms, that noise exists in the document. In some cases, based on the detection that noise exists in the document, the method might continue by removing, using the computing system, the noise from the document. Removing the noise from the document might include, without limitation, identifying, using the computing system, one or more contours of one or more continuous points in the document; determining, using the computing system, one or more first contours associated with potential noise; detecting, using the computing system, whether there are one or more neighboring contours near the one or more first contours associated with potential noise; and, based on a detection of no, one, or more neighboring contours near the one or more first contours associated with potential noise, determining, using the computing system, whether each first contour of the one or more first contours associated with potential noise is not noise or is noise. Once the noise has been determined within the document, the method might continue by generating, using the computing system, a copy of the document with each first contour that is not noise and without each first contour that is noise.

In some embodiments, the document is at least one of a scanned document or an image.

According to some embodiments, detecting that noise exists in the document might include, without limitation, obtaining, using the computing system, one or more historical noise patterns contained in one or more historical documents; correlating, using the computing system and the one or more machine learning algorithms, the one or more historical noise patterns to one or more document patterns contained in the document to detect whether the document contains noise; and based on the correlation the one or more historical noise patterns to the one or more document patterns, detecting, using the computing system, that noise exists in the document.

In some embodiments, the method might include training, using the computing system, the one or more machine learning algorithms to detect one or more historical noise patterns contained in one or more historical documents. Training the one or more machine learning algorithms might include, without limitation, converting, using the computing system, the one or more historical documents to one or more first grayscale images; thresholding, using the computing system, the one or more first grayscale images; identifying, using the computing system and using the one or more first grayscale images that have been thresholded, one or more contours of one or more continuous points in the one or more historical documents; forming, using the computing system, a bounding shape around each of the one or more contours; calculating, using the computing system, an area associated with each bounding shape; based on at least one area associated with at least one bounding shape, detecting, using the computing system, the one or more historical noise patterns associated with noise in the one or more historical documents; and based on the detection of the one or more historical noise patterns associated with noise in the one or more historical documents, training, using the computing system, the one or more machine learning algorithms to detect the one or more historical noise patterns contained in one or more historical documents.

In some embodiments, thresholding the one or more first grayscale images of the one or more historical documents might include, without limitation, converting, using the computing system, one or more first pixels having a value greater than a second threshold to white; and converting, using the computing system, one or more second pixels having a value less than the second threshold to black.

According to some embodiments, identifying the one or more contours of the one or more continuous points in the one or more historical documents might include, without limitation, identifying, using the computing system, a collection of pixels which are continuous, wherein the collection of pixels which are continuous have a similar color or a similar intensity.

In some embodiments, detecting that noise exists in the one or more historical documents based on the at least one area associated with the at least one bounding shape might include, without limitation, determining, using the computing system, that the at least one area is less than a third threshold value. The third threshold value may be determined based on at least one of a defined value, an average area of all of the one or more bounding shapes, or a median area of all of the one or more bounding shapes.

According to some embodiments, the method may identify the one or more contours of the one or more continuous points in the document by identifying, using the computing system, a collection of pixels which are continuous. The collection of pixels which may be continuous may have a similar color or a similar intensity. Identifying the collection of pixels which are continuous might include, without limitation, converting, using the computing system, the document to a first grayscale image and thresholding, using the computing system, the first grayscale image of the document. Thresholding the first grayscale image of the document might include, without limitation, converting, using the computing system, one or more first pixels having a value greater than a second threshold to white; and converting, using the computing system, one or more second pixels having a value less than the second threshold to black. The method might continue by identifying, using the computing system, the collection of pixels which are continuous using at least one of the one or more first pixels having a value greater than a second threshold to white or the one or more second pixels having a value less than the second threshold to black.

In various instances, determining the one or more first contours associated with potential noise might include, without limitation, forming, using the computing system, a bounding shape around the one or more contours; calculating, using the computing system, an area associated with each bounding shape; and based on at least one area associated with at least one bounding shape, detecting, using the computing system, that noise exists in the document. Detecting that noise exists in the document based on at least one area associated with at least one bounding shape may further comprise determining, using the computing system, that the at least one area is less than a second threshold value.

In some cases, detecting whether there are one or more neighboring contours near the one or more first contours associated with potential noise might further include, without limitation, selecting, using the computing system, at least one potential noise contour of the one or more first contours; and determining, using the computing system, whether there are one or more neighboring contours within a predetermined range or a predetermined distance of the at least one potential noise contour.

According to various embodiments, determining, using the computing system, whether each first contour of the one or more first contours associated with potential noise is noise or is not noise might additionally include, without limitation, forming, using the computing system, a bounding shape around the one or more neighboring contours; calculating, using the computing system, an area associated with each bounding shape of the one or more neighboring contours; determining, using the computing system, whether the area of the one or more neighboring contours is larger or smaller than the first threshold; determining, using the computing system, each first contour located near at least one first neighboring contour that is larger than the first threshold is not noise; and determining, using the computing system, each first contour not located near at least one second neighboring contour or located near at least one second neighboring contour that is smaller than the first threshold is noise.

In some instances, the at least one first contour may be at least one of a decimal, a period, a dot, or a comma.

In another aspect, a computing system might include at least one processor communicatively coupled to the one or more antennas; and a non-transitory computer readable medium communicatively coupled to the at least one processor. The non-transitory computer readable medium might have stored thereon computer software comprising a set of instructions that, when executed by the at least one processor, causes the computing system to: receive a document; detect, using one or more machine learning algorithms, that noise exists in the document; and, based on the detection that noise exists in the document, remove the noise from the document. In some cases, removing the noise from the document comprises might include identifying one or more contours of one or more continuous points in the document; determining one or more first contours associated with potential noise; detecting whether there are one or more neighboring contours near the one or more first contours associated with potential noise; and, based on a detection of no, one, or more neighboring contours near the one or more first contours associated with potential noise, determining whether each first contour of the one or more first contours associated with potential noise is not noise or is noise. Once the noise has been determined within the document, the computing system might generate a copy of the document with each first contour that is not noise and without each first contour that is noise.

In some cases, the document may be at least one of a scanned document or an image, and/or the like and the at least one first contour may be at least one of a decimal, a period, a dot, or a comma, and/or the like.

In yet another aspect, a non-transitory computer readable medium might have stored thereon computer software comprising a first set of instructions that, when executed by a processor, causes the processor to: receive a document; detect, using one or more machine learning algorithms, that noise exists in the document; and, based on the detection that noise exists in the document, remove the noise from the document. In some cases, removing the noise from the document comprises might include identifying one or more contours of one or more continuous points in the document; determining one or more first contours associated with potential noise; detecting whether there are one or more neighboring contours near the one or more first contours associated with potential noise; and, based on a detection of no, one, or more neighboring contours near the one or more first contours associated with potential noise, determining whether each first contour of the one or more first contours associated with potential noise is not noise or is noise. Once the noise has been determined within the document, the processor might generate a copy of the document with each first contour that is not noise and without each first contour that is noise.

In some cases, the document may be at least one of a scanned document or an image, and/or the like and the at least one first contour may be at least one of a decimal, a period, a dot, or a comma, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing identification and removal of noise from one or more documents, and, more particularly, for implementing identification and removal of noise from one or more documents using one or more machine learning algorithms, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is an example document 100 containing noise 105, in accordance with various embodiments. The document 100 might include, without limitation, a scanned document, a scanned image, an image file (e.g., a Joint Photographic Experts Group ("JPEG") file, a Portable Network Graphics ("PNG") file, a Graphic Interchange Format file, etc.), a Portable Document Format ("PDF") file, a text file (e.g., a Word file, a Notepad file, etc.), and/or a spreadsheet file (e.g., an Excel file), and/or the like. In some cases, the document 100 may be a financial document such as an invoice, a check, a receipt, and/or the like.

In some cases, the document 100 might contain important or useful information that a computing system (e.g., computing system 205 or 215 of FIG. 2) needs to identify within or extract from the document 100. The important or useful information contained within the document 100 might include, without limitation, numbers, letters, symbols, decimals, periods, dots, and/or commas, and/or the like. The information contained within the document 100 might also include, without limitation, remittance information such as at least one of a customer associated with the document 100, a vendor associated with the document 100, an invoice number associated with the document 100, an invoice amount associated with the document 100, an invoice date associated with the document 100, a payment associated with the document 100, a payment date associated with the document 100, a credit number associated with the document 100, a debit number associated with the document 100, a check number associated with the document 100, or an account number associated with the document 100, and/or the like.

In some cases, the document 100 might contain noise 105. Noise 105 in the document 100 might include, without limitation, salt and pepper noise. Salt and pepper noise, or impulse noise, is a form of noise that presents as sparsely occurring white and black pixels which may obscure important or useful information contained in document 100. The noise 105 might also present as, without limitation, one or more dots, marks, lines, and/or the like obscuring important or useful information contained in document 100. The one or more dots, marks, or lines might be black, white, or any other color. In some cases, the noise 105 might only affect some or part of document 100. Alternatively, in other cases, the noise 105 might all of document 100.

Noise 105 might be introduced into the document 100 via one or more scanners scanning the document 100, one or more copiers copying the document 100, one or more printers printing the document 100, one or more cameras imaging the document 100, one or more imaging devices imaging the document 100, one or more computers performing optical character recognition on the document 100, and/or the like. In some cases, as the quality of the document 100 lessens via one or more scanners scanning the document 100, one or more copiers copying the document 100, one or more printers printing the document 100, one or more cameras imaging the document 100, one or more imaging devices imaging the document 100, one or more computers performing optical character recognition on the document 100, and/or the like, noise 105 may be introduced into the document 100.

The noise 105 might obscure important or useful information contained within the document 100. For example, the noise 105 might obscure a payment amount 110 associated with the document 100, a customer associated with the document 100, a vendor associated with the document 100, an invoice number associated with the document 100, an invoice amount associated with the document 100, an invoice date associated with the document 100, a payment associated with the document 100, a payment date associated with the document 100, a credit number associated with the document 100, a debit number associated with the document 100, a check number associated with the document 100, or an account number associated with the document 100, and/or the like.

When the noise 105 obscures important or useful information such as the payment amount 110, then a computing system might have a hard or difficult time identifying, extracting, or using the important or useful information such as the payment amount 110. Thus, there is a need to remove the noise 105. However, when noise 105 is removed from the document 100, there is also a risk that some information may be interpreted to be noise 105 when it is not actually noise. For example, the decimal point 115 in the payment amount 110 might be removed along with the noise 105. Thus, a computing system may extract $25270 instead of $252.70. This difference in payment amounts may throw of a company's general ledger, accounts receivable account, accounts payable account, and/or the like. Thus, it is important for a computing system to remove the noise 105 from the document 100 without removing other useful or important information such as the decimal point 115 from the document 100.

Systems and methods to remove noise from a document while retaining important or useful information within the document are described in greater detail below with respect to FIGS. 2-6.

Figure 2:
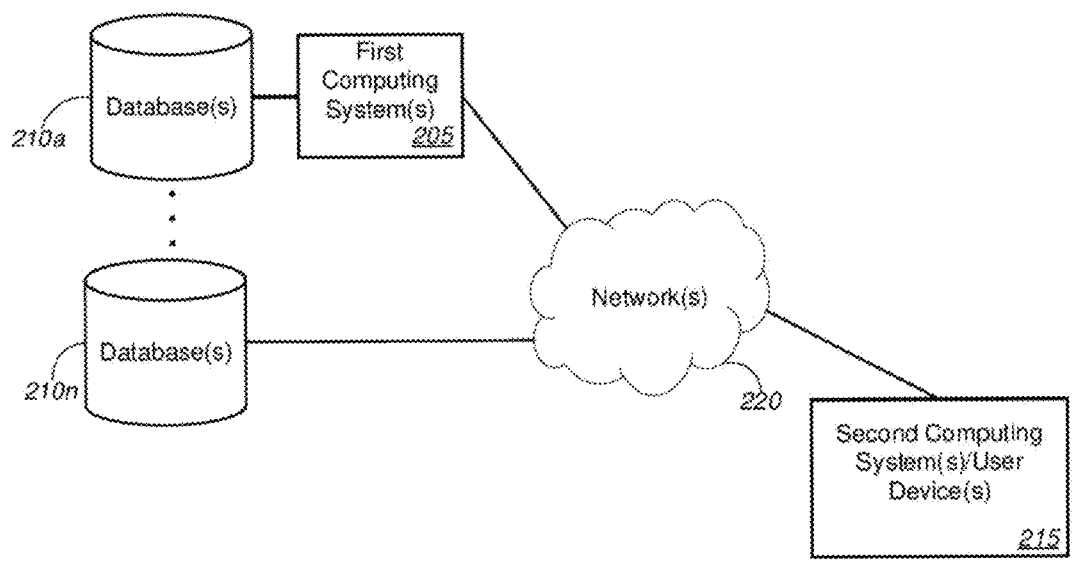
FIG. 2 is a schematic diagram illustrating a system for implementing identification and removal of noise from one or more documents, in accordance with various embodiments.

FIG. 2 is a schematic diagram illustrating a system 200 for implementing identification and removal of noise from one or more documents, in accordance with various embodiments. Although lines are used to denote communicative couplings and/or connections (e.g., wireless and/or wired connections) between devices, one or more intermediary devices (not shown) and/or networks (not shown) may be located between the one or more devices of FIG. 2.

In the non-limiting embodiment of FIG. 2, system 200 might comprise a first computing system(s) 205 and one or more corresponding database(s) 210a-210n (collectively, databases(s) 210) communicatively coupled to first computing system(s) 205. In some embodiments, system 200 might further include one or more second computing system(s) 215, one or more network(s) 220, and/or the like. Although the database(s) 210 and the one or more second computing systems 215 are shown to be external to the first computing system 205, the various embodiments are not so limited and the database(s) 210 and the one or more second computing systems 215 might be disposed within the first computing system 205. In some cases, the database(s) 210 and/or second computing system 215 may located within a same network or customer premises as the first computing system 205. Alternatively, the database(s) 210 and/or second computing system 215 may be remote from and/or located within a different network or customer premises than the first computing system 205.

In some embodiments, the first computing system 205 and/or the second computing system 215 might include, without limitation, a first processor (not shown) and a first memory (not shown). In some embodiments, the first computing system 205 and/or the second computing system 215 may include, without limitation, one or more of a user device, a server computer, a server computer over a network, a cloud-based computing system, a cloud-based computing system over a network, or a distributed computing system, and/or the like. In some cases, the first computing system 205 and/or the second computing system 215 may be, without limitation, at least one of a server computer, a desktop computer, a laptop computer, a tablet computer, a smart phone, a cellphone, a mobile phone, a personal digital assistant, or any suitable device capable of communicating via a web-based portal, an application programming interface ("API"), a server, a software application ("app"), or any other suitable communications interface, or the like. In some cases, the first computing system 205 and/or the second computing system 215 might be communicatively coupled to one or more scanners, one or more copiers, one or more printers, one or more cameras, one or more imaging devices, and/or the like. In some cases, the one or more scanners, one or more copiers, one or more printers, one or more cameras, one or more imaging devices, and/or the like may be integrated with or separate from the first computing system 205 and/or the second computing system 215.

System 200 might further comprise network(s) 220, which might communicatively couple at least one of the first computing system(s) 205, the database(s) 210, and/or the second computing system 215, and/or the like. The network(s) 220 might be service provider networks, content provider networks, local area networks, and/or the like. Network(s) might include, without limitation, one of a fiber network, an Ethernet network, a Token-Ring™ network, a wide-area network ("WAN"), a wireless wide area network ("WWAN"), a virtual private network ("VPN"), the Internet, an intranet, an extranet, a public switched telephone network ("PSTN"), an infra-red network, a wireless network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol, and/or any combination of these and/or other networks In operation, the first computing system(s) 205 and/or the second computing system(s) 215 might receive one or more documents (e.g., document 100 of FIG. 1 or document 400 of FIG. 4) containing important or useful information that needs to be identified and/or extracted. The one or more documents might include, without limitation, one or more scanned documents, one or more scanned images, one or more image files (e.g., one or more Joint Photographic Experts Group ("JPEG") files, one or more Portable Network Graphics ("PNG") files, one or more Graphics Interchange Format files, etc.), one or more Portable Document Format ("PDF") files, one or more text files (e.g., one or more Word files, one or more Notepad files, etc.), or one or more spreadsheet files (e.g., one or more Excel files), and/or the like.

In various embodiments, the one or more documents may be received by the first computing system(s) 205 and/or the second computing system(s) 215 via one or more scanners, one or more copiers, one or more printers, one or more cameras, one or more imaging devices, and/or the like. Additionally and/or alternatively, the one or more documents may be received by the first computing system(s) 205 and/or the second computing system(s) 215 via email, text, or other electronic messaging service.

Next, the first computing system(s) 205 and/or the second computing system(s) 215 might detect, using one or more machine learning algorithms, that noise exists in the document. Noise in the document might include, salt and pepper noise. In some cases, the noise may present as, one or more dots, marks, lines, and/or the like. The one or more machine learning algorithms may be trained to detect noise using one or more historical documents containing noise stored in databases 210a-210n.

As noise is introduced into the one or more documents, the first computing system(s) 205 and/or the second computing system(s) 215 might be unable to extract important or useful information from the one or more documents because the first computing system(s) 205 and/or the second computing system(s) 215 may be unable to determine the difference between the noise and the important or useful information. Thus, there is a need to detect noise within the one or more documents and remove the noise from the one or more documents while retaining important or useful information.

In some embodiments, based on the detection of noise within the one or more documents, the first computing system(s) 205 and/or the second computing system(s) 215 might remove the noise from the one or more documents. The noise may be removed from the one or more documents using one or more machine learning algorithms trained to remove noise based on the one or more historical documents stored in database(s) 210a-210n.

In some cases, the first computing system(s) 205 and/or the second computing system(s) 215, using the one or more machine learning algorithms, might identify one or more contours of one or more continuous points in the one or more documents and determine one or more first contours associated with potential noise. Next, the first computing system(s) 205 and/or the second computing system(s) 215, using the one or more machine learning algorithms, might detect whether there are one or more neighboring contours near the one or more first contours associated with potential noise and determine whether any neighboring contours are larger or smaller than a first threshold. Based on a detection of no, one, or more neighboring contours near the one or more first contours associated with potential noise, the first computing system(s) 205 and/or the second computing system(s) 215, using the one or more machine learning algorithms, might determine whether each first contour of the one or more first contours associated with potential noise is not noise or is noise.

Once a determination has been made regarding the potential noise, a copy of the one or more documents may be generated. The copy of the one or more documents contains each first contour that is not noise and does not contain each first contour that is noise.

These and other functions of the system 200 (and its components) are described in greater detail below with respect to FIGS. 3-6.

FIGS. 3A-3H (collectively, FIG. 3) are flow diagrams illustrating a method 300 for implementing identification and removal of noise from one or more documents, in accordance with various embodiments. While the techniques and procedures are depicted and/or described in a certain order for purposes of illustration, it should be appreciated that certain procedures may be reordered and/or omitted within the scope of various embodiments. Moreover, while the method 300 illustrated by FIG. 3 can be implemented by or with (and, in some cases, are described below with respect to) the systems, examples, or embodiments 100, 300, and 400 of FIGS. 1, 3, and 4, respectively (or components thereof), such methods may also be implemented using any suitable hardware (or software) implementation. Similarly, while each of the systems, examples, or embodiments 100, 300, and 400 of FIGS. 1, 3, and 4, respectively (or components thereof), can operate according to the method 300 illustrated by FIG. 3 (e.g., by executing instructions embodied on a computer readable medium), the systems, examples, or embodiments 100, 300, and 400 of FIGS. 1, 3, and 4 can each also operate according to other modes of operation and/or perform other suitable procedures.

In the non-limiting embodiment of FIG. 3, method 300, may comprise, at block 302, receiving, using a computing system (e.g., computing system 205 and/or 215 of FIG. 2), one or more documents containing important or useful information. In some embodiments, the computing system might include, without limitation, a first processor and a first memory. In some embodiments, the computing system may include, without limitation, one of a user device, a server computer, a server computer over a network, a cloud-based computing system, a cloud-based computing system over a network, or a distributed computing system, and/or the like.

The one or more documents might include, without limitation, one or more scanned documents, one or more scanned images, one or more image files (e.g., one or more Joint Photographic Experts Group ("JPEG") files, one or more Portable Network Graphics ("PNG") files, one or more Graphic Interchange Format files, etc.), one or more Portable Document Format ("PDF") files, one or more text files (e.g., one or more Word files, one or more Notepad files, etc.), and/or one or more spreadsheet files (e.g., one or more Excel files), and/or the like. In some cases, the one or more documents may be one or more financial documents such as an invoice, a check, a receipt, and/or the like.

In some cases, the one or more documents might contain important or useful information that a computing system needs to identify within or extract from the one or more documents. The important or useful information contained within the one or more documents might include, without limitation, numbers, letters, symbols, decimals, periods, dots, or commas, and/or the like. The information contained within the one or more documents might also include, without limitation, remittance information such as at least one of a customer associated with the one or more documents, a vendor associated with the one or more documents, an invoice number associated with the one or more documents, an invoice amount associated with the one or more documents, an invoice date associated with the one or more documents, a payment associated with the one or more documents, a payment date associated with the one or more documents, a credit number associated with the one or more documents, a debit number associated with the one or more documents, a check number associated with the one or more documents, and/or an account number associated with the one or more documents, and/or the like.

In some embodiments, method 300 might continue onto block 304 to detect, using one or more machine learning algorithms, that noise exists in the one or more documents.

In some instances, the one or more documents might contain noise. Noise in the one or more documents might include, without limitation, salt and pepper noise. In some cases, the noise might also present as, without limitation, one or more dots, marks, lines, and/or the like obscuring important or useful information contained in the one or more documents. Noise might be introduced into the one or more documents via one or more scanners scanning the one or more documents, one or more copiers copying the one or more documents, one or more printers printing the one or more documents, one or more cameras imaging the one or more documents, one or more imaging devices imaging the one or more documents, one or more computers performing optical character recognition on the one or more documents, and/or the like.

Figure 3A:
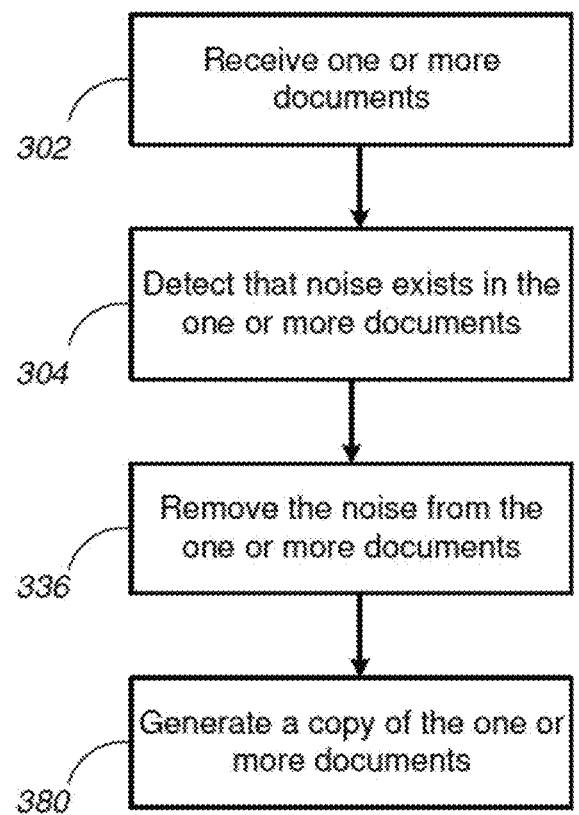
FIGS. 3A-3H are flow diagrams illustrating a method for implementing identification and removal of noise from one or more documents, in accordance with various embodiments.
Figure 3B:
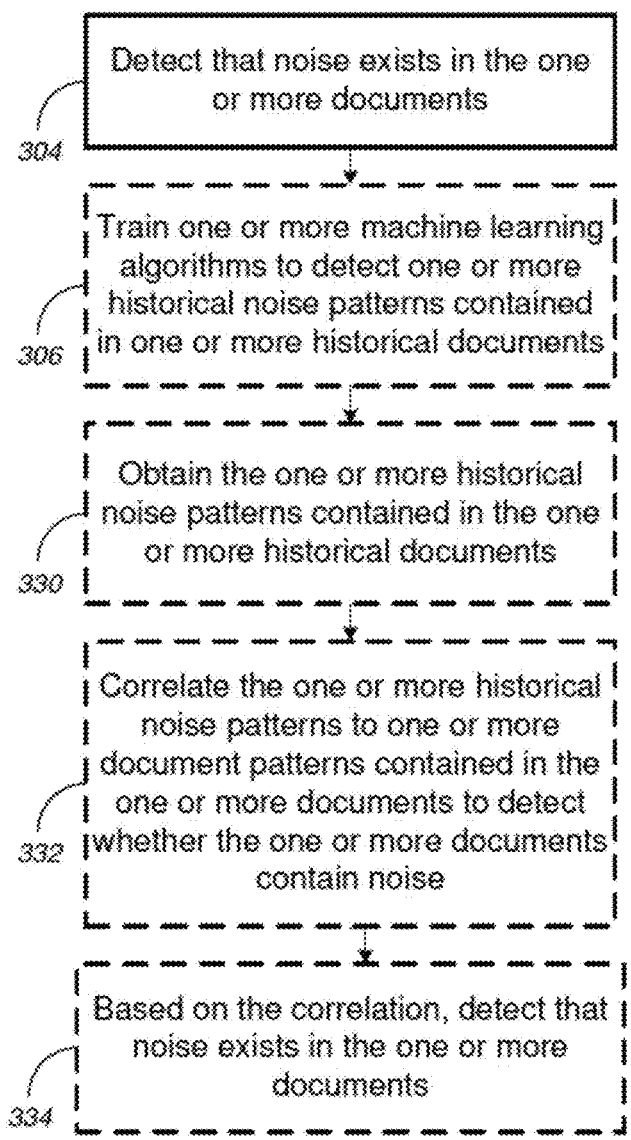

In order to detect noise in the one or more documents, the method 300 might continue onto optional block 306 in FIG. 3B. At optional block 306, the method 300 might continue by training, using the computing system, the one or more machine learning algorithms to detect one or more historical noise patterns contained in one or more historical documents.

Figure 3C:
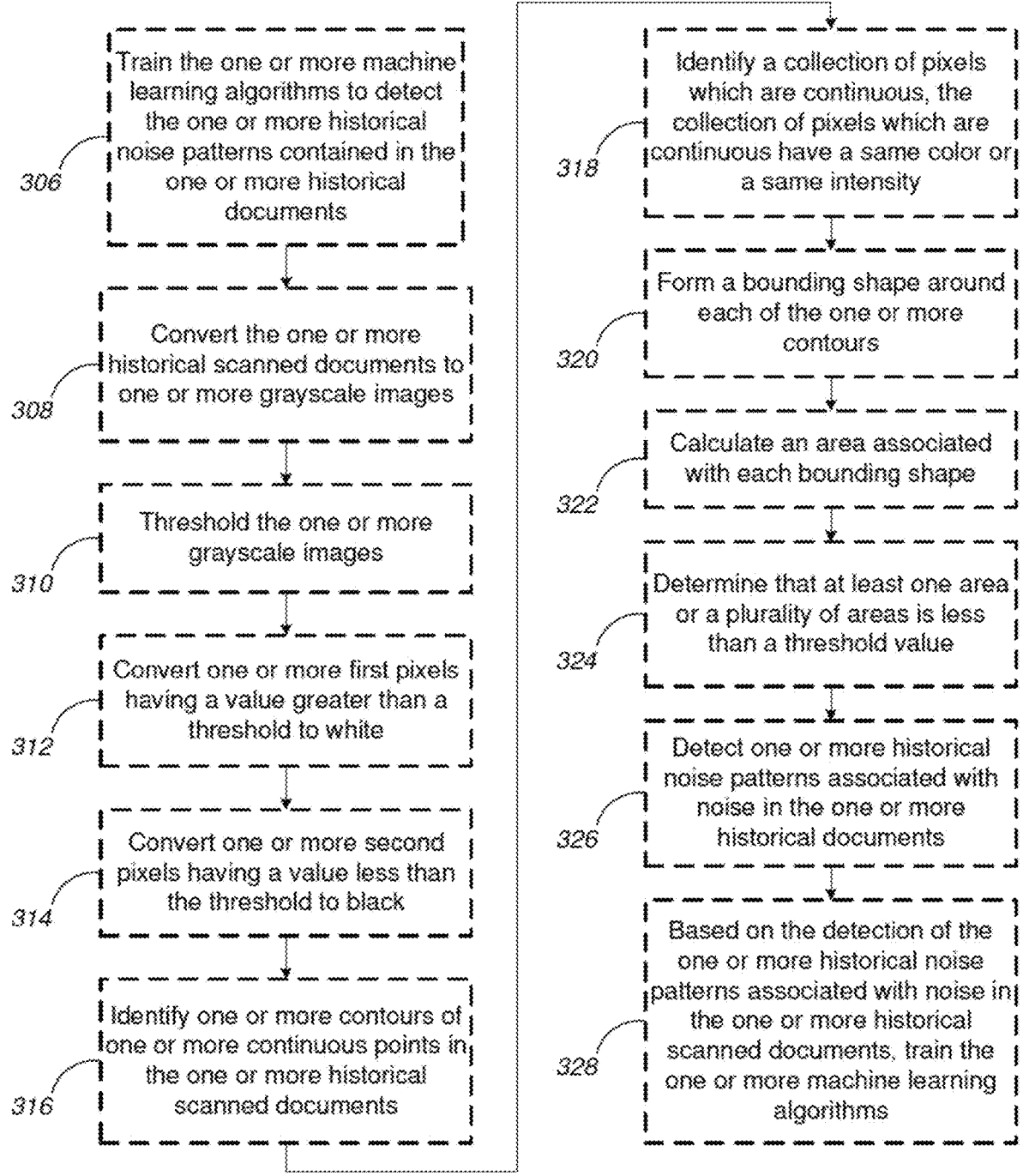
Figure 4A:
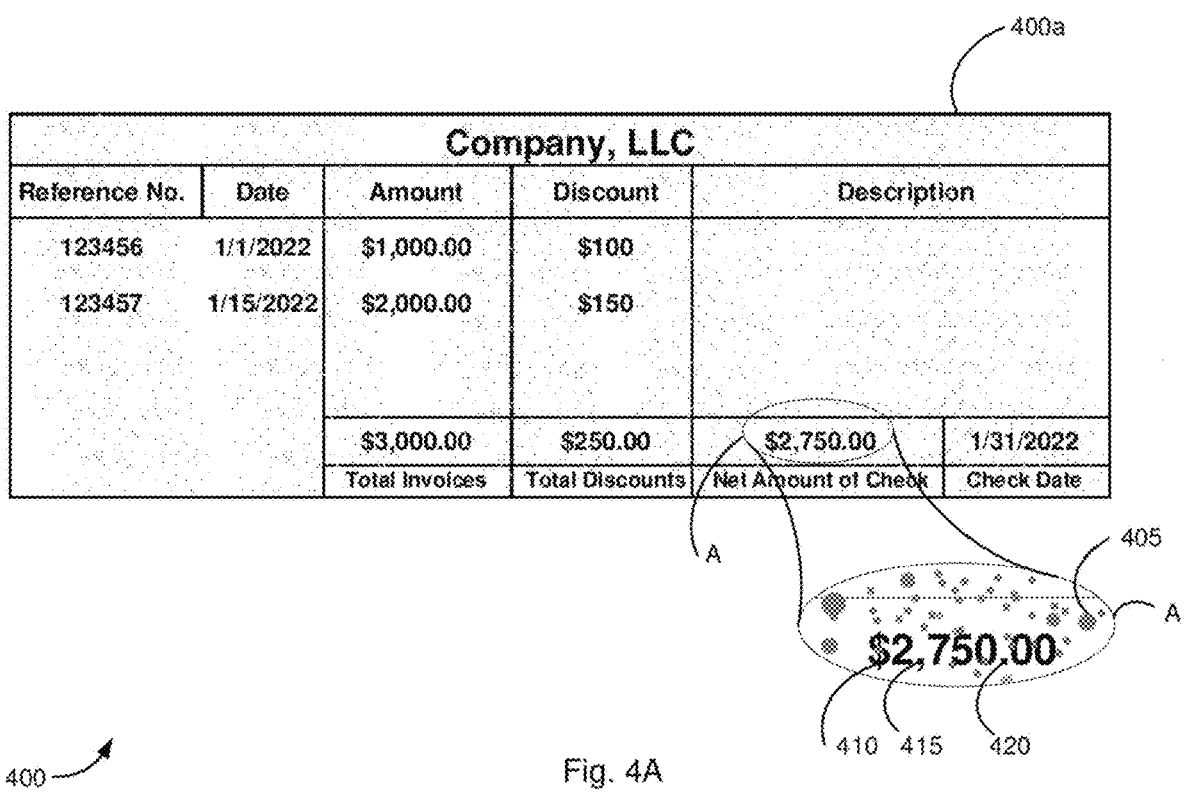

In order to train the one or more machine learning algorithms to detect the one or more historical noise patterns contained in the one or more historical documents, the method 300 might continue onto optional block 308 in FIG. 3C. At optional block 308, method 300 might include converting, using the computing system, the one or more historical documents to one or more grayscale images (an example grayscale image is shown in FIG. 4A). The one or more grayscale images may be configured to contain only white pixels and shades of black pixels. Each pixel in the one or more gray scale images may have or be assigned a value. These values may range from, but are not limited to, 0 to 255.

Figure 4B:
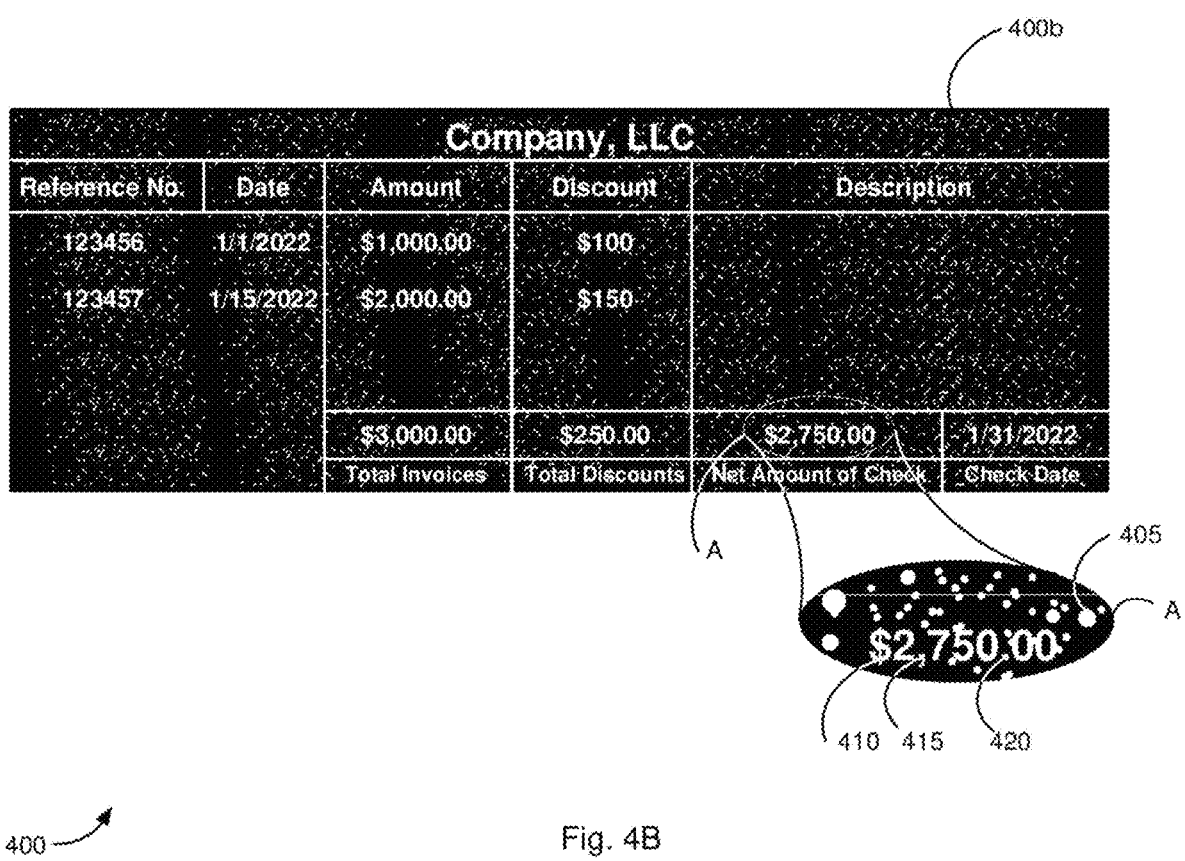

Next, method 300, at optional block 310 might include thresholding, using the computing system, the one or more first grayscale images. Thresholding the one or more grayscale images might include, at optional block 312, converting, using the computing system, one or more first pixels having a value greater than a threshold to white and, at optional block 314, converting, using the computing system, one or more second pixels having a value less than the threshold to black. In a non-limiting example, in order to threshold a grayscale image, all pixels having values greater than the threshold are converted to a pixel value of 255 or white and all pixels having values less than the threshold are converted to a pixel value of 0 or black. An example of a thresholded grayscale image is shown in FIG. 4B.

Once all of the pixels have been converted to black or white in the one or more historical documents, the method 300 might continue at optional block 316 by identifying, using the computing system and using the one or more first grayscale images that have been thresholded, one or more contours of one or more continuous points in the one or more historical documents. Thresholding a grayscale image allows a computing system to more efficiently and effectively identify the contours within the thresholded grayscale images because the pixels within the thresholded grayscale image are either 0 or black or 255 or white.

Figure 4C:
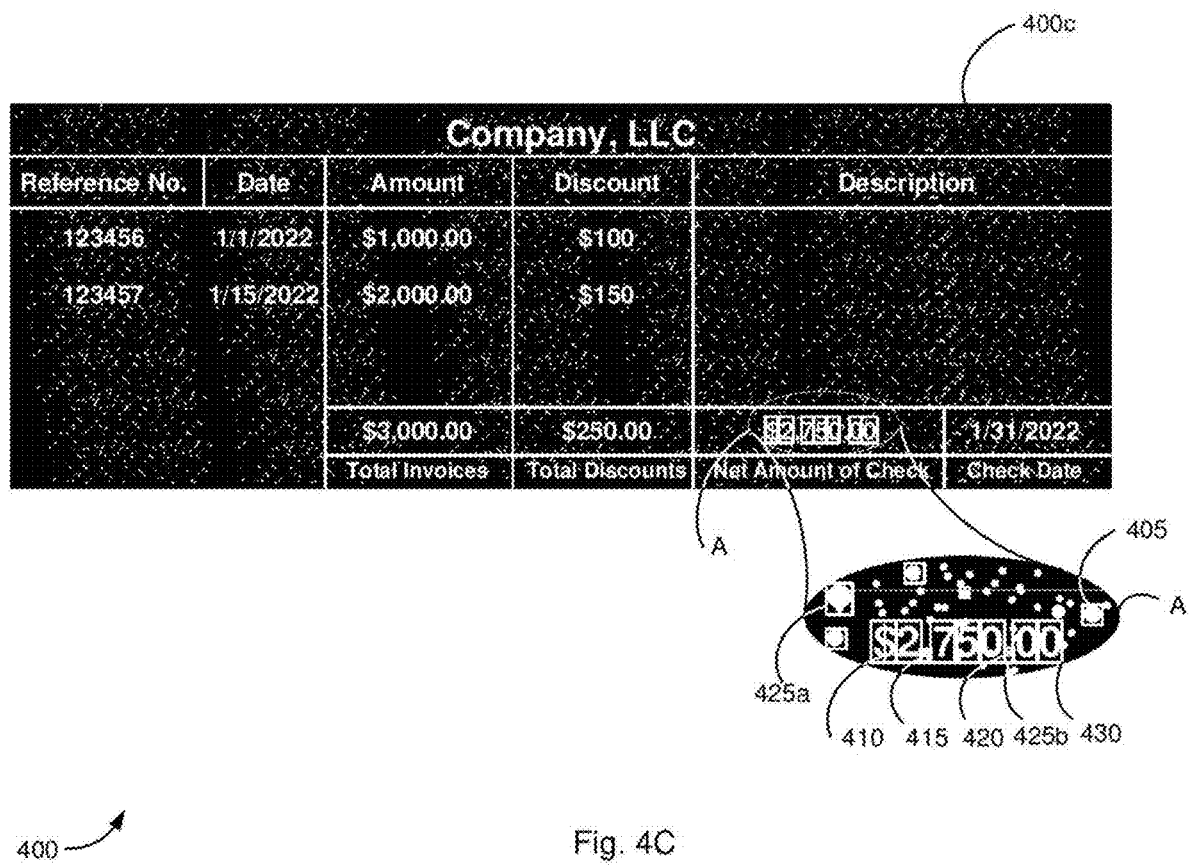

Contours may be a curve joining all the continuous points along a boundary of pixels. Identifying the one or more contours of the one or more continuous points in the one or more historical documents, might include, at optional block 318, identifying, using the computing system, a collection of pixels which are continuous. The collection of pixels which are continuous may have a similar color or a similar intensity and may be located near or next to one another. In a non-limiting example, one or more pixels having a value of 255 or white located near each other or next to each other in a thresholded image might be determined to be continuous points or contours in the one or more historical documents. In some instances, the computing system may only determine contours based on one value (e.g., 0 or 255) and not both. In other words, only pixels having a value of 255 might be identified to determine the one or more contours as shown in FIG. 4C.

The contours may be used as a tool for shape and pattern analysis and object detection and recognition in the one or more historical documents. For example, the computing system may use the contours to determine one or more numbers, letters, decimals, periods, dots, or commas, and/or the like. Additionally and/or alternatively, the one or more contours may be used to determine one or more noise patterns.

Once the contours have been determined, method 300 might continue onto optional block 320. At optional block 320, method 300 might continue by forming, using the computing system, a bounding shape around each of the one or more contours. An example of a bounding shape formed around one or more contours is shown in FIG. 4C. The bounding shape may be at least one of a circle, a square, a rectangle, a triangle, or any other shape. In some cases, other information associated with each contour or bounding shape may be determined as well. In a non-limiting example, based on the bounding shape or independent of the bounding shape, one or more top-left, top-center, top-right, middle-left, middle-center, middle-right, bottom-left, bottom-center, bottom-right, etc. coordinates of a contour or bounding shape of a contour may be determined. Additionally or alternatively, a shape, pattern, etc. of a contour may be determined.

Next, an area of the bounding shape of each contour may be calculated at optional block 322 of method 300. An area of each bounding shape may be calculated to determine a size or an approximate size of a particular contour. The area associated with each bounding shape may be used to determine whether a particular contour is likely to be associated with potential noise or unlikely to be associated with noise. Smaller contours or smaller areas of bounding shapes are more likely to be noise while larger contours or larger areas of bounding shapes are more likely to be one or more numbers, letters, or symbols.

Once the area of each contour is calculated, the method 300, at optional block 324, might continue by determining, using the computing system, that at least one area of the one or more contours is less than a threshold value and/or continue by determining, using the computing system, that a plurality of areas of the one or more contours is less than a threshold value. This threshold value may be dynamic and change from historical document to historical document. In some instances, the threshold value is determined based on at least one of a defined value, an average area of all of the one or more bounding shapes located in each historical document, or a median area of all of the one or more bounding shapes located in each historical document.

Based on a determination that at least one area of the one or more contours is less than a threshold value and/or based on a determination that a plurality of areas of the one or more contours is less than threshold value, the method 300, might determine that noise exists in the one or more historical documents and might, at optional block 326, detect, using the computing system, one or more historical noise patterns associated with noise in the one or more historical documents. In some instances, the method 300 might only determine that noise exists within the one or more historical documents when a certain percentage (e.g., 20%, 50%, 80%) of bounding shapes or contours are below the threshold value. In a non-limiting example, the computing system might only determine that noise exists when 30% of the bounding shapes are below the threshold value.

In various embodiments, method 300, at optional block 328, might train, using the computing system, the one or more machine learning algorithms to detect the one or more historical noise patterns contained in one or more historical documents. In other words, the one or more machine learning algorithms may determine a location or position of the one or more bounding shapes or contours that are below the threshold value and determine that these locations, positions, or patterns of pixels are typically associated with noise. By training the one or more machine learning algorithms to recognize noise, the one or more machine learning algorithms may then be used to efficiently and effectively detect noise patterns in the one or more documents received by the computing system.

Once the machine learning algorithms have been trained using the method 300 described in FIG. 3C, the method 300, might continue on to optional block 330 of FIG. 3B. Method 300, at optional block 3B, might include obtaining, using the computing system, the one or more historical noise patterns contained in the one or more historical documents. Next, method 300, at optional block 332 might continue by correlating, using the computing system and the one or more machine learning algorithms, the one or more historical noise patterns to one or more document patterns contained in the one or more documents to detect whether the one or more documents contain noise. The one or more historical noise patterns and the one or more document patterns might be correlated to determine a similarity between the one or more historical noise patterns and the one or more document patterns. Based on a determination that the one or more more historical noise patterns correlate to or are similar to the one or more document patterns, method 300, at optional block 334, might determine that noise exists in the one or more documents.

When noise exists in the one or more documents, the computing system may have a difficult time extracting important or useful information. Thus, it is important to remove the noise form the one or more documents while retaining the important or useful information. In order to do this, method 300 may continue onto optional block 336 of FIG. 3A by removing, using the computing system, the noise from the one or more documents. The computing system may use one or more machine learning algorithms to remove noise from the one or more documents.

Figure 3D:
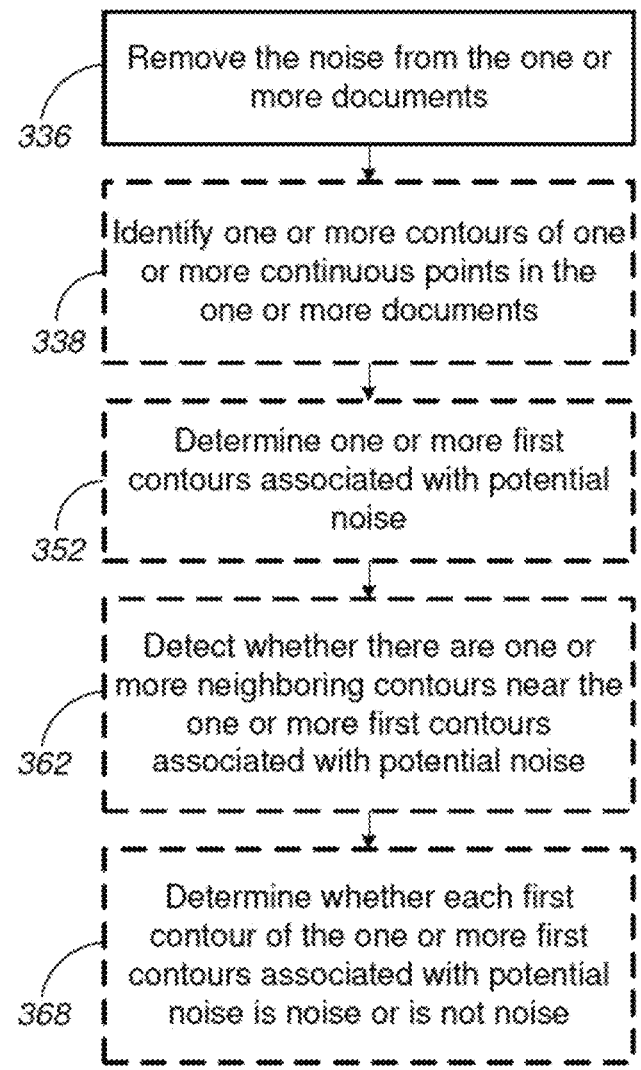
Figure 3E:
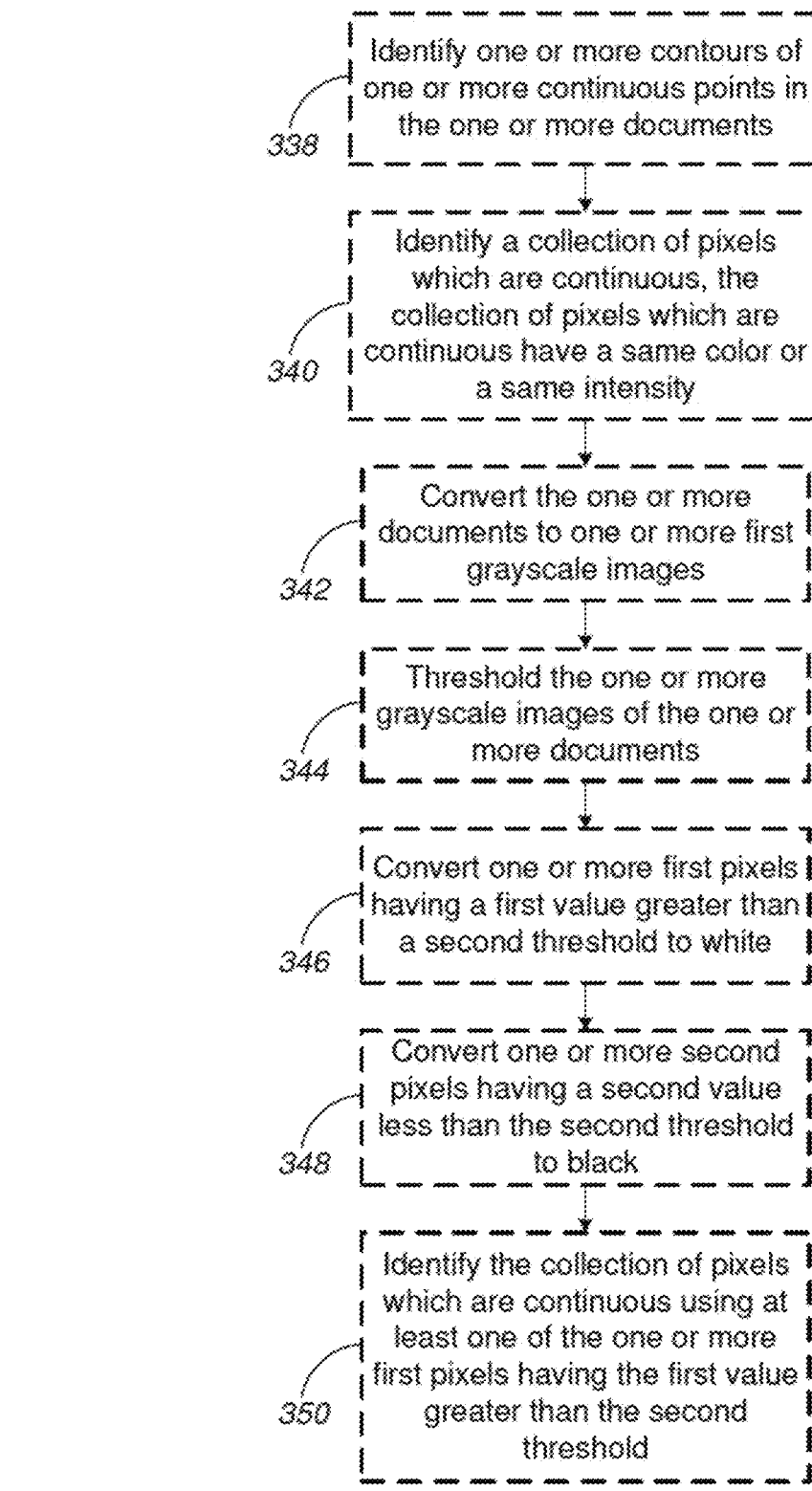
Figure 3F:
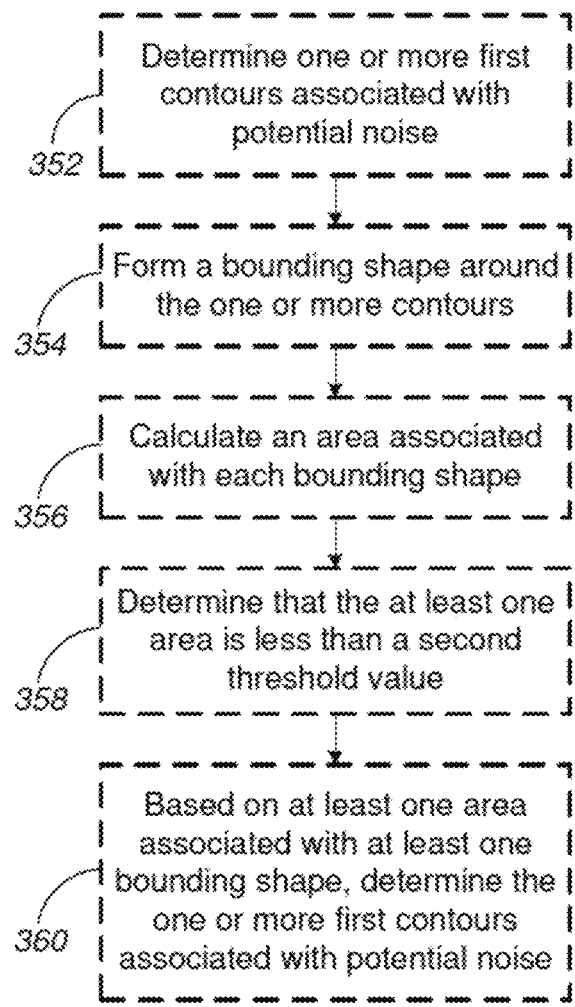
Figure 3G:
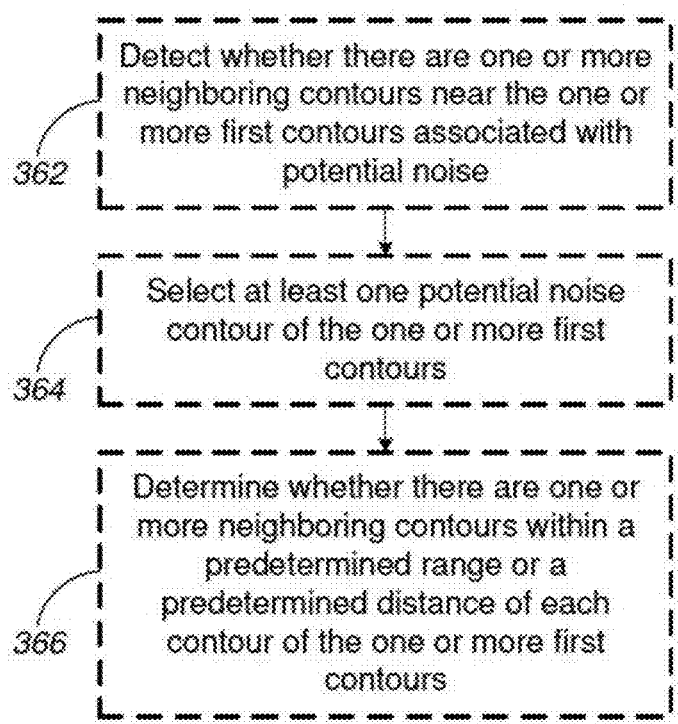
Figure 3H:
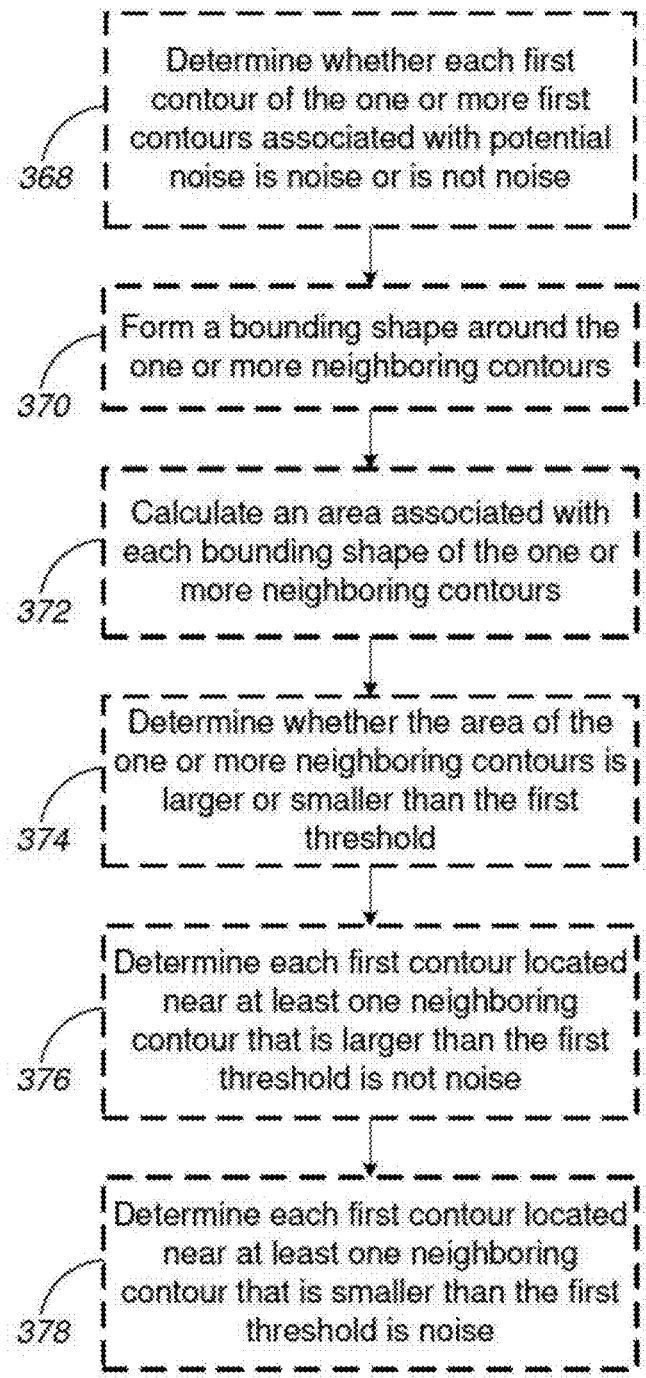

In order to remove noise from the one or more documents, the method 300 might continue onto optional block 338 of FIG. 3D. At optional block 338, method 300 might include, identifying, using the computing system, one or more contours of one or more continuous points in the one or more documents. Contours may be a curve joining all the continuous points along a boundary of pixels. The method 300 may then continue onto optional block 340 of FIG. 3E. At optional block 340 the method 300 might identify, using the computing system, a collection of pixels which are continuous. The collection of pixels which are continuous may have a similar color or a similar intensity. The computing system may use one or more machine learning algorithms to identify the one or more contours in the one or more documents.

In order to identify collections of pixels which are continuous (e.g., having a similar color or intensity), the method 300, might continue at optional block 342, by converting, using the computing system, the one or more documents to one or more grayscale images (an example grayscale image is shown in FIG. 4A). The one or more grayscale images may be configured to contain only white pixels and shades of black pixels. Each pixel in the one or more grayscale images may have or be assigned a value. These values may range from, but are not limited to, 0 to 255.

Next, method 300, at optional block 344 might include thresholding, using the computing system, the one or more grayscale images. Thresholding the one or more grayscale images might include, at optional block 346, converting, using the computing system, one or more first pixels having a value greater than a threshold to white and, at optional block 348, converting, using the computing system, one or more second pixels having a value less than the threshold to black. In a non-limiting example, in order to threshold the grayscale image, all pixels having values greater than the threshold are converted to a pixel value of 255 or white and all pixels having values less than the threshold are converted to a pixel value of 0 or black. An example of a thresholded grayscale image is shown in FIG. 4B.

Once the one or more documents have been thresholded, the method 300 may continue at optional block 350 by identifying, using the computing system, the collection of pixels which are continuous using at least one of the one or more first pixels having the first value greater than the second threshold. In a non-limiting example, one or more pixels having a value of 255 or white located near each other or next to each other in a thresholded image might be determined to be continuous points or contours in the one or more documents.

Based on a determination of the one or more contours within the one or more documents, method 300, at optional block 352, might return to FIG. 3D and include determining, using the computing system, one or more first contours associated with potential noise within the one or more documents. In order to determine whether there are one or more contours associated with potential noise in the one or more documents, method 300 might continue to FIG. 3F at optional block 354. At optional block 354, the method 300 might include, without limitation, forming, using the computing system, a bounding shape around the identified one or more contours. An example of a bounding shape formed around one or more contours is shown in FIG. 4C. The bounding shape may be at least one of a circle, a square, a rectangle, a triangle, or any other shape. In some cases, other information associated with each contour or bounding shape may be determined as well. In a non-limiting example, based on the bounding shape or independent of the bounding shape, one or more top-left, top-center, top-right, middle-left, middle-center, middle-right, bottom-left, bottom-center, bottom-right, etc. coordinates of a contour or bounding shape of a contour may be determined. Additionally or alternatively, a shape, pattern, etc. of a contour may be determined.

Next, an area of the bounding shape of each contour may be calculated at optional block 356 of method 300. An area of each bounding shape may be calculated to determine a size or an approximate size of a particular contour. The area associated with each bounding shape may be used to determine whether a particular contour is likely to be associated with potential noise or unlikely to be associated with noise. Smaller contours or smaller areas of bounding shapes are more likely to be noise while larger contours or larger areas of bounding shapes are more likely to not be noise and more likely to be one or more numbers, letters, or symbols.

Once the area of each contour is calculated, the method 300, at optional block 358, might continue by determining, using the computing system, that at least one area of the one or more contours is less than a threshold value and/or continue by determining, using the computing system, that a plurality of areas of the one or more contours is less than a threshold value. This threshold value may be dynamic and change from document to document using one or more machine learning algorithms. In some instances, the threshold value is determined based on at least one of a defined value, an average area of all of the one or more bounding shapes located in each document, or a median area of all of the one or more bounding shapes located in each document.

Based on a determination that at least one area of the one or more contours is less than a threshold value and/or based on a determination that a plurality of areas of the one or more contours is less than the threshold value, the method 300, at optional block 360, might determine the one or more first contours associated with potential noise. However, a determination that the one or more first contours may be associated with potential noise does not mean that the one or more first contours are noise. Further, analysis of the one or more documents is necessary to determine whether the one or more first contours are noise or are not noise.

In some cases, based on a determination of the one or more first contours associated with potential noise, the method 300 might return to FIG. 3D, at optional block 362, to determine whether the one or more first contours associated with potential noise are actual noise or useful or important information. At optional block 362, method 300 might include, without limitation, detecting, using the computing system, whether there are one or more neighboring contours near the one or more first contours associated with potential noise. In order to detect whether there are one or more neighboring contours near the one or more first contours associated with potential noise, the method 300 might continue at FIG. 3G, at optional block 364, by selecting, using the computing system, at least one potential noise contour of the one or more first contours and, at optional 366, determining, using the computing system, whether there are one or more neighboring contours within a predetermined range or a predetermined distance of the at least one potential noise contour. If there are one or more neighboring contours within a predetermined range or a predetermined distance of the at least one potential noise contour, then further analysis of the at least one potential noise contour is needed.

In some cases, method 300 might return to FIG. 3D, at optional block 368. Based on a detection of one or more neighboring contours near the one or more first contours associated with potential noise, method 300, at optional block 368, method 300 might determine, using the computing system, whether each contour of the one or more first contours associated with potential noise is noise or is not noise. In order to determine whether each contour of the one or more first contours associated with potential noise is noise or is not noise, method 300, at optional block 370, might continue onto FIG. 3H.

In some cases, at optional block 370, method 300 might include, without limitation, forming, using the computing system, a bounding shape around the one or more neighboring contours. In some cases, this bounding shape may have already been formed in optional step 354 of FIG. 3F. Next, at optional block 372, the method may continue by calculating, using the computing system, an area associated with each bounding shape of the one or more neighboring contours. Based on the area associated with each bounding shape of the one or more neighboring contours, the method 300, at optional block 374 might include determining, using the computing system, whether the area of the one or more neighboring contours is larger or smaller than the first threshold used to determine whether a contour is noise or is not noise in optional step 358.

If the one or more neighboring contours are larger than the first threshold, then each first contour of the one or more contours associated with potential noise located near one or more neighboring contours larger than the first threshold is less likely to be noise. The method 300, at optional block 376, might determine each first contour of the one or more contours associated with potential noise located near one or more neighboring contours larger than the first threshold are not noise. If the one or more neighboring contours are smaller than the first threshold or if there are no neighboring contours, then each first contour of the one or more contours associated with potential noise located near no neighboring contours or located near the one or more neighboring contours smaller than the first threshold are more likely to be noise. The method 300, at optional block 378, might determine each first contour of the one or more contours associated with potential noise located near one or more neighboring contours smaller than the first threshold or located near no neighboring contours are noise.

In some cases, the method 300, using the computing system, might use additional factors (e.g., position or location of potential noise contours, position or location of potential noise contours with respect to neighboring contours, shape of neighboring contours, pattern of neighboring contours, type of document being processed, etc.) to determine whether a potential noise contour is likely associated with noise or is not noise.

In a non-limiting example, a computing system may determine a location of a potential noise contour with respect to one or more neighboring contours. For example, if a potential noise contour is located toward a bottom of one or more neighboring contours larger than the first threshold, then it is more likely that the potential noise contour is at least one of a decimal, a period, a dot, or a comma, and/or the like. However, if a potential noise contour is located toward a top of one or more neighboring contours, then it is more likely an apostrophe or noise.

In another non-limiting example, if a potential noise contour is located between one or more neighboring contours larger than the first threshold and having a shape of a number, then it is more likely that the potential noise contour is at least one of a decimal, a period, a dot, or a comma, and/or the like. However, if a potential noise contour is located toward a top of one or more neighboring contours larger than the first threshold and having a shape of a number, then it is more likely that the potential noise contour is noise and not an apostrophe (because apostrophes generally do not occur in numbers). Alternatively, if a potential noise contour is located toward a top of one or more neighboring contours larger than the first threshold and having a shape of a letter, then it is more likely that the potential noise contour is not noise and is an apostrophe.

In yet another non-limiting example, if a potential noise contour is located in a remittance document, then a computing system might flag that potential noise contours are more likely to be remittance information (e.g., dots, decimals, commas, etc.), when the potential noise contours are located between two neighboring contours that are larger than the first threshold.

Once a determination has been made for each contour associated with potential noise, method 300 might proceed back to FIG. 3A, at optional block 380. At optional block 380, method 300 might include generating a copy of the one or more documents. The generated copy of the one or more documents is shown in FIG. 4D. The generated copy of the one or more documents might have all contours determined to be noise removed while retaining all contours determined not to be noise. Once the generated copy of the one or more documents have been generated, these generated documents may be used by a computing system to extract important or useful information from the one or more documents. By removing the noise from the one or more generated documents, the one or more generated documents may be clearer and sharper than the one or more documents originally received by the computing system.

In a non-limiting example, the method 300 described in FIG. 3, can revive dots and commas, and/or the like, which would typically be removed with other noise detected in the one or more documents. This method may consider, among other factors, that dots and commas generally come in remittance documents (e.g., invoice documents), for instance, 6,243.90 has both a decimal and a comma occurring between numbers. A potential noise contour will be revived if its neighboring contours are large, in the case of 6,243.90, a comma comes between "6" and "2" which are large contours, similarly a dot comes between "3" and "9" which are again large. A contour will be retrieved if the area of its nearest neighboring contour is greater than the first threshold. Thus, the dot and comma in 6,243.90 will be retrieved using the method 300 because the neighboring contours surrounding the dot and comma are large.

These and other functions of the method 300 are described in greater detail above and below with respect to FIGS. 1, 2, and 4-6.

FIGS. 4A-4D (collectively, FIG. 4) includes an example document 400 illustrating the method for implementing identification and removal of noise 405 from one or more documents, in accordance with various embodiments. The example document 400 from FIGS. 4A-4D may be used to illustrate at least some of the steps of method 300. The example document 400 might be similar to document 100 of FIG. 1 or the documents described with respect to FIGS. 2 and 3. For purposes of illustration, this description focuses on the content contained in oval A of example document 400, which represents a zoomed in portion of the example document 400. A person of ordinary skill in the art would understand that this description could be applied to the entire document 400.

FIG. 4 comprises an example document 400 containing noise 405, in accordance with various embodiments. The document 400 further comprises, among other information, a net amount 410 of a check, a comma 415 in the net amount 410, and a decimal point 420 in the net amount 410.

FIG. 4A is a grayscale image 400*a* of the document 400. The grayscale image 400*a* may be configured to contain only white pixels and shades of black pixels. Each pixel in the grayscale image may have or be assigned a value based on its shade of white or black. These values may range from, but are not limited to, 0 to 255.

FIG. 4B is a thresholded grayscale image 400*b* of document 400. Thresholding the grayscale image of FIG. 4A might include converting one or more first pixels of the grayscale image 400*a* of FIG. 4A having a value greater than a threshold to white and converting one or more second pixels in the grayscale image 400*a* of FIG. 4A having a value less than the threshold to black. In a non-limiting example, in order to threshold the grayscale image 400*a*, all pixels having values greater than the threshold are converted to a pixel value of 255 or white and all pixels having values less than the threshold are converted to a pixel value of 0 or black.

Once the document 400 has been thresholded creating thresholded document 300*b*, potential noise contour bounding boxes 425*a* and 425*b* (collectively, potential noise contour bounding boxes 425) and larger contour bounding boxes 430 may be drawn in the thresholded document 400*c*, as shown in FIG. 4C. Although only some bounding boxes are shown in FIG. 4C, a bounding box 425 and/or 430 may be drawn for each potential noise contour or larger contour of thresholded document 400*c*. The bounding boxes 425 and 430 do not need to be box shaped, but can be any shape (e.g., a circle, an oval, a square, a rectangle, a triangle, or any other shape). Additionally, different reference numbers 425 and 430 for the bounding boxes are used. These reference numbers are used for ease of reference, but the way each bounding box 425 and 430 is created is the same.

In order to draw each potential noise contour bounding box 425 and/or larger contour bounding box 430, a computing system might identify one or more contours of one or more continuous points in the thresholded document 400*c*. Contours may be a curve, shape, or pattern (e.g., a number, a letter, a symbol, noise, etc.) joining all the continuous points along a boundary of pixels. Identifying the one or more contours of the one or more continuous points in the thresholded document 400*c*, might include, identifying, using a computing system, a collection of pixels which are continuous. The collection of pixels which are continuous may have a similar color or a similar intensity. In a non-limiting example, one or more pixels having a value of 255 or white located near each other or next to each other in a thresholded document 400*c* of FIG. 4C might be determined to be continuous points or contours in the thresholded document 400*c*. In some instances, the computing system may only determine a contour based on one value (e.g., 0 or 255) and not both. In other words, as shown in FIG. 4C, only pixels having a value of 255 might be identified to determine the one or more contours.

Once the one or more contours have been determined, a bounding box 425 and/or 430 might be drawn around the one or more contours. The size or area of the bounding box 425 and/or 430 will be determined based the size of the contour. Smaller contours likely associated with potential noise may be surrounded by potential noise contour bounding boxes 425 while larger contours likely associated with numbers, letters, or symbols may be surrounded by larger bounding boxes 430.

Next, an area of the bounding box 425 and/or 430 of each contour may be calculated. Based on the area of each bounding box of each contour, the bounding boxes may be associated with potential noise contours or larger contours that are likely not noise. Smaller contours or areas of potential noise bounding boxes 425 are more likely to be associated with noise while larger contours or areas of bounding boxes 430 are more likely to be associated with one or more numbers, letters, or symbols. Based on the calculated area of each bounding box 425 and/or 430, the computing system might calculate a threshold value to sort the contours into smaller contours more likely to be associated with noise and larger contours more likely to be associated with one or more numbers, letters, or symbols.

This threshold value may be dynamic and change from document to document. Contours associated with bounding boxes 430 larger than the threshold value are treated as numbers, letters, or symbols while contours associated with bounding boxes 425 smaller than the threshold value are treated as potential noise.

Once the contours have been sorted into larger contours and contours associated with potential noise. The computing system must further analyze the thresholded document 400*c* to determine whether potential noise is actual noise. In order to do this, the computing system might detect one or more neighboring contours located near or within a predetermined range of the one or more potential noise contours (e.g., potential noise contours associated with bounding boxes 425*a* and 425*b*).

If there are or more neighboring contours located near or within a predetermined range of the one or more potential noise contours, then the computing system might determine whether those neighboring contours are larger or smaller than the threshold value. If the nearby neighboring contours are smaller than the threshold or if there are no nearby neighboring contours as is the case with the contour associated with potential noise contour bounding box 425*a*, the contour is likely associated with potential noise and can be removed by the computing system from document 400. Alternatively, if the nearby neighboring contours are larger than the threshold as is the case with the contour associated with contour box 425*b,* the contour is less likely associated with potential noise and should be retained within document 400.

Once each potential noise contour has been determined to be noise or not noise, a clean copy 400*d* of document 400 may be generated as shown in FIG. 4D. FIG. 4D shows all noise 405 removed from the document 400 while the important or useful information (e.g., net amount 410, comma 415, and decimal point 420) has been retained. This copy 400*d* of document 400 may then be used by a computing system to extract important or useful information from the document.

Exemplary System and Hardware Implementation

Figure 5:
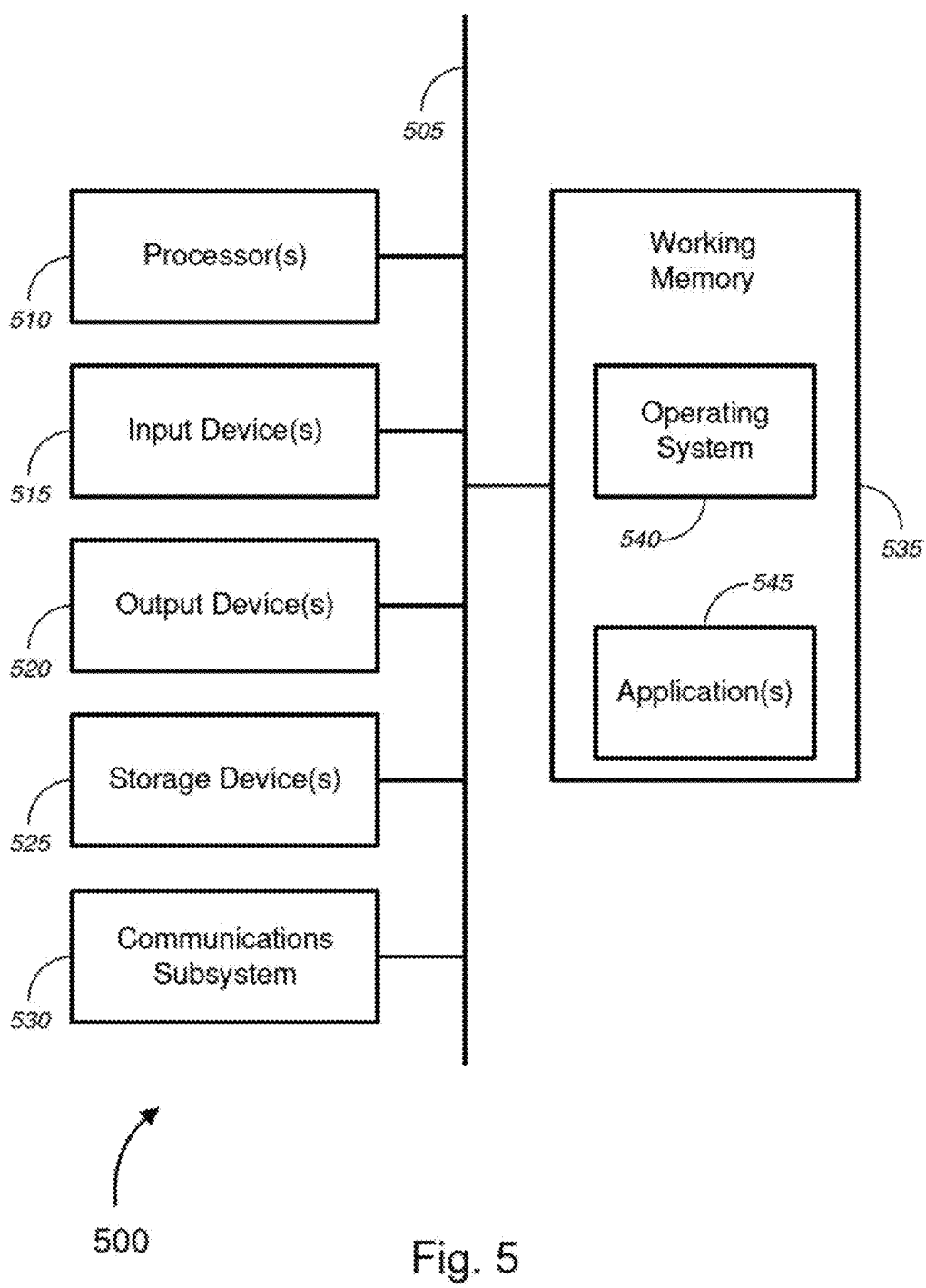
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of system hardware that can perform the methods provided by various other embodiments, as described herein, and/or can perform the functions of computer or hardware system (e.g., first computing system(s) 205, second computing system(s) 215, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (e.g., first computing system(s) 205, second computing system(s) 215, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
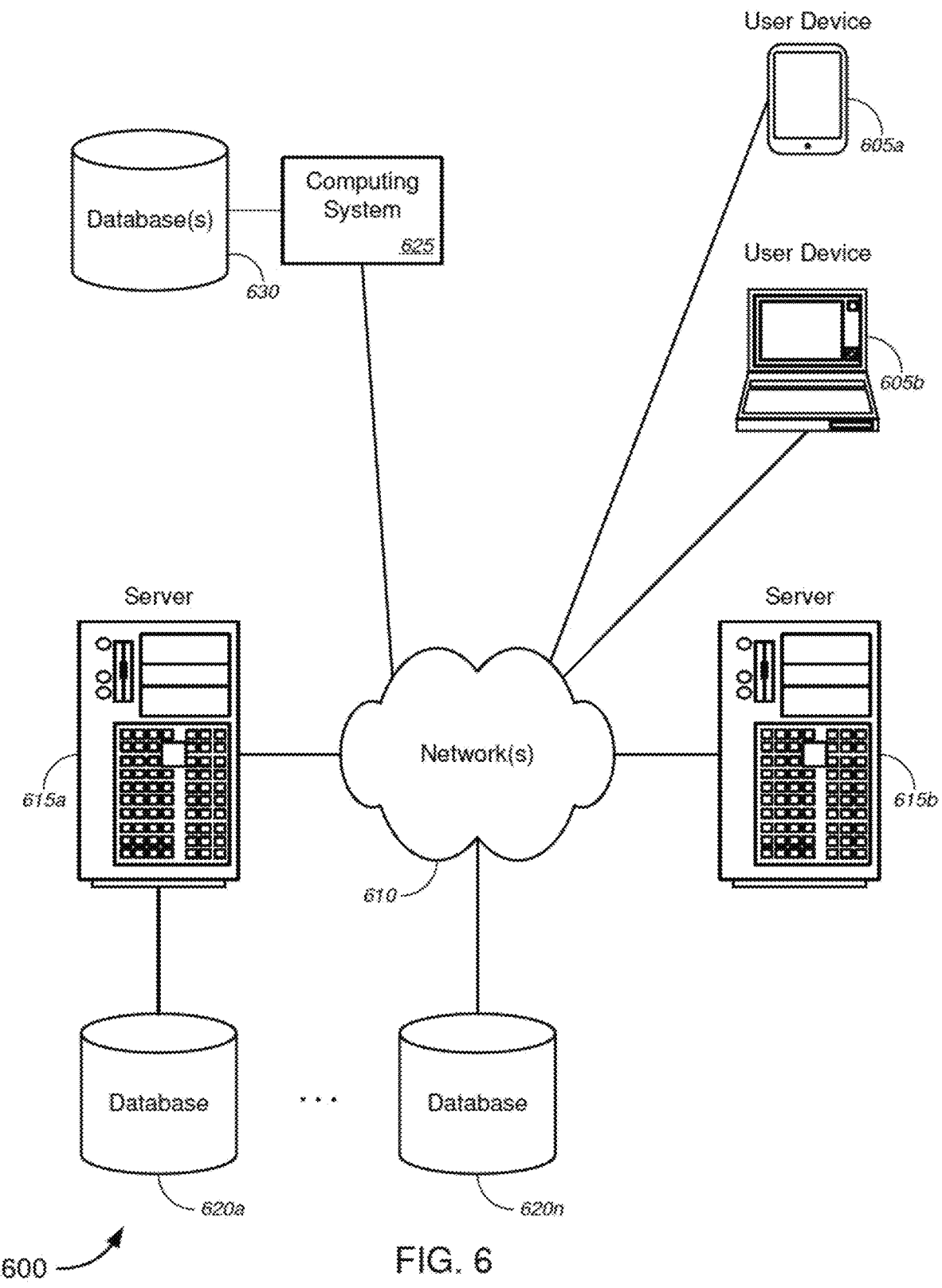
FIG. 6 is a block diagram illustrating a networked system of computers, computing systems, or system hardware architecture, which can be used in accordance with various embodiments.

As noted above, a set of embodiments comprises methods and systems for detecting and correcting anomalous events in real-time in finance and accounting and, more particularly, methods, systems, and apparatuses for detecting and correcting anomalous events in real-time as users enter data into a general ledger. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 220 of FIG. 2, or the like) can each include a local area network ("LAN"), including, without limitation, a fiber network, an Ethernet network, a Token-Ring™ network, and/or the like;

a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for detecting and correcting anomalous events in real-time in finance and accounting and, more particularly, for detecting and correcting anomalous events in real-time as users enter data into a general ledger, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to first computing system 205 of FIG. 2, or the like) and corresponding database(s) 630 (similar to database(s) 210 of FIG. 2, or the like).

In operation, one or more computing systems 625 might receive one or more documents. The one or more computing systems 625 might detect noise within the one or more documents. Based on the detection that noise exists in the one or more documents, the one or more computing systems 625 might remove the noise from the one or more documents. Once the noise is removed from the one or more documents, the one or more computing systems 625 might generate a copy of the one or more documents with the noise removed.

These and other functions of the system 600 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, using a computing system, a document;
   detecting, using the computing system and one or more machine learning algorithms, that noise exists in the document;
   based on the detection that noise exists in the document, removing, using the computing system, the noise from the document, wherein removing the noise from the document comprises:
     identifying, using the computing system, one or more contours of one or more continuous points in the document;
     determining, using the computing system, one or more first contours of the one or more contours associated with potential noise;
     detecting, using the computing system, whether there are one or more neighboring contours near the one or more first contours associated with potential noise; and
     based on a detection of no, one, or more neighboring contours near the one or more first contours associated with potential noise, determining, using the computing system, whether each first contour of the one or more first contours associated with potential noise is not noise or is noise; and
   generating, using the computing system, a copy of the document with each first contour that is not noise and without each first contour that is noise.

2. The method of claim 1, wherein the document is at least one of a scanned document or an image.

3. The method of claim 1, wherein detecting that noise exists in the document comprises:
   obtaining, using the computing system, one or more historical noise patterns contained in one or more historical documents;
   correlating, using the computing system and the one or more machine learning algorithms, the one or more historical noise patterns to one or more document patterns contained in the document to detect whether the document contains noise; and
   based on the correlation the one or more historical noise patterns to the one or more document patterns, detecting, using the computing system, that noise exists in the document.

4. The method of claim 3, further comprising:
   training, using the computing system, the one or more machine learning algorithms to detect the one or more historical noise patterns contained in the one or more historical documents, wherein training the one or more machine learning algorithms comprises:
     converting, using the computing system, the one or more historical documents to one or more first grayscale images;
     thresholding, using the computing system, the one or more first grayscale images;
     identifying, using the computing system and using the one or more first grayscale images that have been thresholded, one or more contours of one or more continuous points in the one or more historical documents;
     forming, using the computing system, a bounding shape around each of the one or more contours;
     calculating, using the computing system, an area associated with each bounding shape;
     based on at least one area associated with at least one bounding shape, detecting, using the computing system, the one or more historical noise patterns associated with noise in the one or more historical documents; and
     based on the detection of the one or more historical noise patterns associated with noise in the one or more historical documents, training, using the computing system, the one or more machine learning algorithms to detect the one or more historical noise patterns contained in one or more historical documents.

5. The method of claim 4, wherein thresholding the one or more first grayscale images of the one or more historical documents comprises:
   converting, using the computing system, one or more first pixels having a value greater than a second threshold to white; and
   converting, using the computing system, one or more second pixels having a value less than the second threshold to black.

6. The method of claim 4, wherein identifying the one or more contours of the one or more continuous points in the one or more historical documents comprises:
   identifying, using the computing system, a collection of pixels which are continuous, wherein the collection of pixels which are continuous have a similar color or a similar intensity.

7. The method of claim 4, wherein detecting that noise exists in the one or more historical documents based on the at least one area associated with the at least one bounding shape further comprises:
   determining, using the computing system, that the at least one area is less than a third threshold value.

8. The method of claim 7, wherein the third threshold value is determined based on at least one of a defined value, an average area of all of the one or more bounding shapes, or a median area of all of the one or more bounding shapes.

9. The method of claim 1, wherein identifying the one or more contours of the one or more continuous points in the document comprises:
  identifying, using the computing system, a collection of pixels which are continuous, wherein the collection of pixels which are continuous have a similar color or a similar intensity.

10. The method of claim 9, wherein identifying the collection of pixels which are continuous comprises:
  converting, using the computing system, the document to a first grayscale image;
  thresholding, using the computing system, the first grayscale image of the document by:
    converting, using the computing system, one or more first pixels having a first value greater than a second threshold to white; and
    converting, using the computing system, one or more second pixels having a second value less than the second threshold to black; and
  identifying, using the computing system, the collection of pixels which are continuous using at least one of the one or more first pixels having a value greater than the second threshold.

11. The method of claim 1, wherein determining the one or more first contours associated with potential noise comprises:
  forming, using the computing system, a bounding shape around the one or more contours;
  calculating, using the computing system, an area associated with each bounding shape; and
  based on at least one area associated with at least one bounding shape, determining, using the computing system, the one or more first contours associated with potential noise.

12. The method of claim 11, wherein determining the one or more first contours associated with potential noise based on at least one area associated with at least one bounding shape further comprises:
  determining, using the computing system, that the at least one area is less than a second threshold value.

13. The method of claim 1, wherein detecting whether there are one or more neighboring contours near the one or more first contours associated with potential noise further comprises:
  selecting, using the computing system, at least one potential noise contour of the one or more first contours; and
  determining, using the computing system, whether there are one or more neighboring contours within a predetermined range or a predetermined distance of the at least one potential noise contour.

14. The method of claim 1, wherein determining, using the computing system, whether each first contour of the one or more first contours associated with potential noise is noise or is not noise further comprises:
  forming, using the computing system, a bounding shape around the one or more neighboring contours;
  calculating, using the computing system, an area associated with each bounding shape of the one or more neighboring contours;
  determining, using the computing system, whether the area of the one or more neighboring contours is larger or smaller than a first threshold;
  determining, using the computing system, each first contour located near at least one first neighboring contour that is larger than the first threshold is not noise; and
  determining, using the computing system, each first contour not located near at least one second neighboring contour or located near at least one second neighboring contour that is smaller than the first threshold is noise.

15. The method of claim 1, wherein at least one first contour of each first contour is at least one of a decimal, a period, a dot, or a comma.

16. A computing system comprising:
  at least one processor; and
  a non-transitory computer readable medium communicatively coupled to the at least one processor, the non-transitory computer readable medium having stored thereon computer software comprising a set of instructions that, when executed by the at least one processor, causes the computing system to:
  receive a document;
  detect, using one or more machine learning algorithms, that noise exists in the document;
  based on the detection that noise exists in the document, remove the noise from the document, wherein removing the noise from the document comprises:
    identify one or more contours of one or more continuous points in the document;
    determine one or more first contours of the one or more contours associated with potential noise;
    detect whether there are one or more neighboring contours near the one or more first contours associated with potential noise;
    determine that at least one first contour of the one or more first contours having at least one neighboring contour that is larger than a first threshold is not noise and keep the at least one first contour; and
    based on a detection of no, one, or more neighboring contours near the one or more first contours associated with potential noise, determine whether each first contour of the one or more first contours associated with potential noise is not noise or is noise; and
  generate a copy of the document with each first contour that is not noise and without each first contour that is noise.

17. The computing system of claim 16, wherein the document is at least one of a scanned document or an image.

18. The method of claim 16, wherein at least one first contour is at least one of a decimal, a period, a dot, or a comma.

19. A non-transitory computer readable medium having stored thereon computer software comprising a first set of instructions that, when executed by a processor, causes a computing system to:
  receive a document;
  detect, using one or more machine learning algorithms, that noise exists in the document;
  based on the detection that noise exists in the document, remove the noise from the document, wherein removing the noise from the document comprises:
    identify one or more contours of one or more continuous points in the document;
    determine one or more first contours of the one or more contours associated with potential noise;
    detect whether there are one or more neighboring contours near the one or more first contours associated with potential noise;
    determine that at least one first contour of the one or more first contours having at least one neighboring contour that is larger than a first threshold is not noise and keep the at least one first contour; and
    based on a detection of no, one, or more neighboring contours near the one or more first contours associated with potential noise, determine whether each first contour of the one or more first contours associated with potential noise is not noise or is noise; and generate a copy of the document with each first contour that is not noise and without each first contour that is noise.

20. The computing system of claim 19, wherein the document is at least one of a scanned document or an image.

* * * * *